No. 872,161. PATENTED NOV. 26, 1907.
T. WHITEHORN.
APPARATUS FOR PACKING PREDETERMINED QUANTITIES IN BAGS.
APPLICATION FILED APR. 24, 1907.
2 SHEETS—SHEET 1.
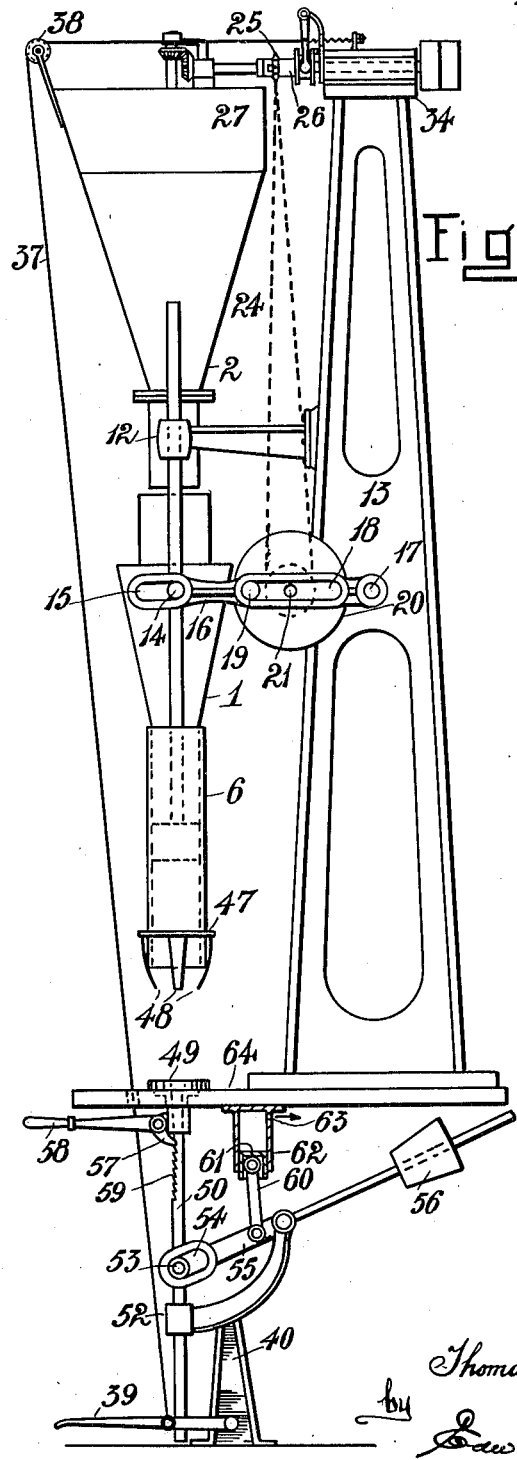
Fig-1-
Witnesses
Walter C. Hart
William G. Holden
Inventor
Thomas Whitehorn
by
Saw Waters & Sons
Attorneys

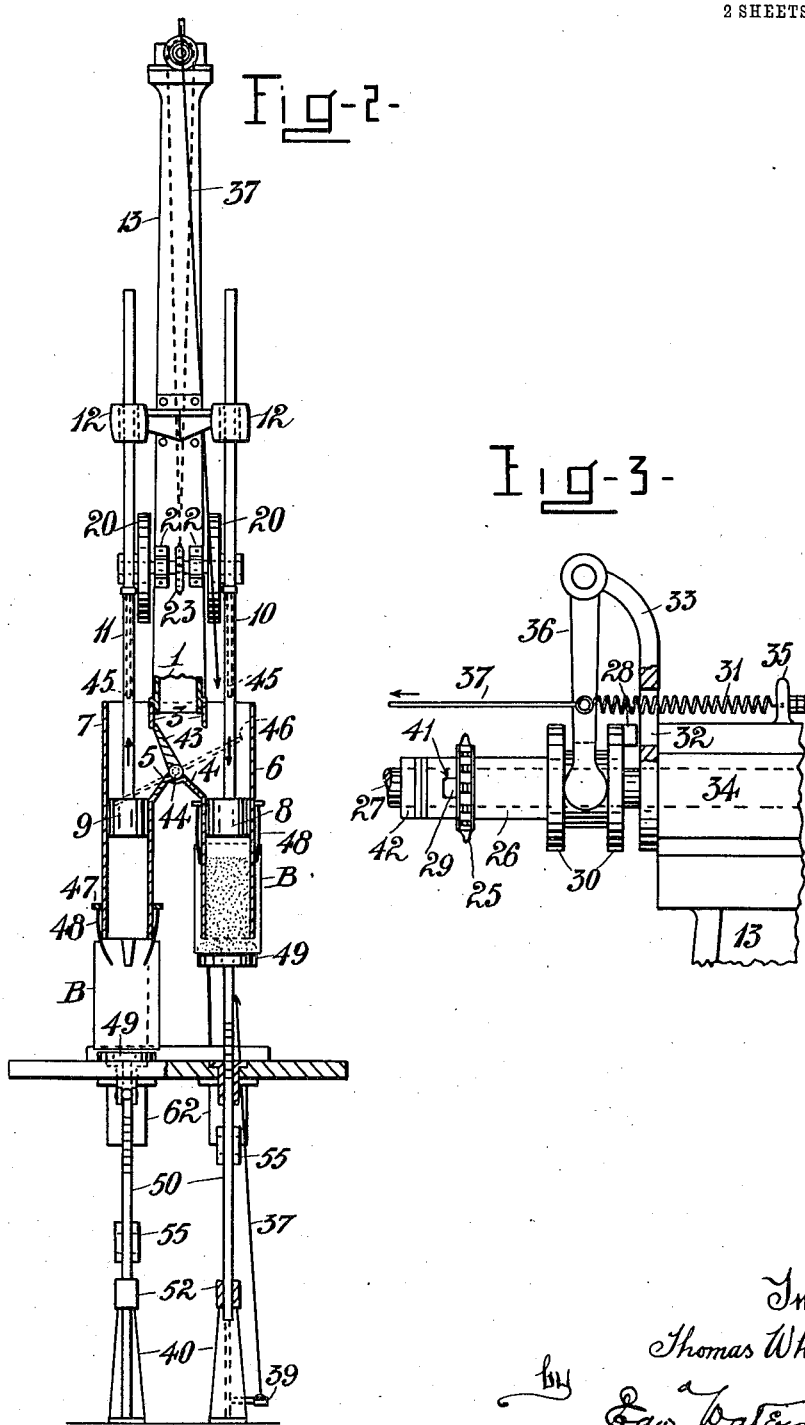

UNITED STATES PATENT OFFICE.

THOMAS WHITEHORN, OF COBURG, VICTORIA, AUSTRALIA.

APPARATUS FOR PACKING PREDETERMINED QUANTITIES IN BAGS.

No. 872,161.　　　　　Specification of Letters Patent.　　　　Patented Nov. 26, 1907.

Application filed April 24, 1907. Serial No. 870,067.

*To all whom it may concern:*

Be it known that I, THOMAS WHITEHORN, a subject of the King of Great Britain, residing at No. 19 Munro street, Coburg, in the State of Victoria, Australia, mechanic, have invented Improved Apparatus for Packing Predetermined Quantities in Bags, of which the following is a specification.

This apparatus is intended for use in conjunction with machines which weigh out given quantities of flour, tea or other divided substances and is consequently arranged by preference below the delivery thereof.

The accompanying drawings which clearly illustrate the invention and show the same in its relation to one kind of weighing machine comprise;

Figure 1 is a side elevation. Fig. 2 is a part vertical section and part front elevation, and Fig. 3 is an enlarged side elevation of the clutch mechanism.

The substance to be packed is delivered in predetermined quantities from the chute 1 of the weighing machine 2 or from any other source into a central vertical chute 3 having a pair of oppositely inclined legs 4, 5 leading respectively to a pair of vertical open ended cylinders 6, 7, situate on either side of said chute and over which the bags are drawn. Within said cylinders are alternately reciprocating plungers 8, 9, the rods 10, 11 of which slide in bearings 12, 12 on a standard 13 and are each provided with a lateral pin 14 adapted to engage a slot 15 in one end of a lever 16 which is pivoted at its other end as at 17 upon said standard. Said lever has another slot 18 into which projects the crank pin 19 of a crank disk 20 secured to a horizontal shaft 21 journaled in bearings 22, 22, on the standard. Upon said shaft is a sprocket 23 geared by means of a chain 24 with another sprocket 25 formed integral with a clutch 26 movably mounted on an overhead prime motor shaft 27, which latter is preferably the driving one of the weighing machine when the apparatus is used in conjunction therewith.

The clutch 26 has a projecting tooth 28, 29 at both ends, the former 28 being formed on a collar 30 of the clutch and adapted to be normally held in engagement by a spring 31 with a slot 32 formed in an upwardly extending arm 33 secured to a bearing 34 on the standard. Said spring is attached at one end to a lug 35 on the bearing 34 and passing through the upper part of the slot 32 of the arm 33 is attached at its other end to the operating lever 36 of the clutch, which is pivoted on said arm. A wire rope or the like 37 is attached at one end to said lever 36 and passing around a pulley 38 is connected at its other end to a treadle 39 pivoted to a bracket 40, secured to the floor. The other tooth 29 of the clutch is adapted to engage a recess 41 formed in the end of a shoulder 42 attached to the shaft 27 when the treadle 39, is operated as in Figs. 1 and 3. The effect of this clutch mechanism is as follows:—When the treadle is operated the tooth 28 is released from the slot 32 in the arm 33, and the tooth 29 is forced into engagement with the slot 41 in the shoulder 42 of the shaft 27. Motion is thus transmitted to the shaft 21 and the plungers 8 and 9 reciprocate in opposite directions, and during this movement the tooth 28 rides against the face of the arm 33.

When the plungers reach the limit of their strokes the tooth 28 comes again opposite its slot and the tension of the spring 31 draws it thereinto, thus releasing the other tooth 29 and stopping the motion of the plungers. The substance is directed alternately to the cylinders by means of a door or shutter 43 pivoted upon a spindle 44 at the junction of the inclined legs 4, 5, and the opening to one leg is closed when the plunger adjacent to said door is descending and vice versa. This action is achieved by means of tappets 45 on the plunger rods 10, 11 engaging alternately the respective ends of a lever 46 mounted on the spindle 44 of said door.

In order that the bags B may be properly opened to enable same to be readily slipped on to the cylinders, each of the latter is provided on the outside with a sleeve 47 formed with downwardly extending and inwardly contracted spring fingers 48, which project below the cylinder while the bag is being drawn on, after which both the bag and sleeve are slid up over said cylinder as in Fig. 2.

Below each cylinder is a vertically movable platform 49 mounted on a vertical rod 50 working in bearings 51, 52 one of which is formed in the table 64 of the apparatus and the other on the bracket 40; said rod has a lateral pin 53 engaging a slot 54 formed in one end of a lever 55 pivoted upon said bracket and the other end of said lever is provided with an adjustable weight 56. The rod of the table is held down by an overbalanced retaining pawl 57 provided with a handle 58 and adapted to engage ratchet teeth 59 formed in said rod, and in order to retard the vertical movement of the table the lever 55 is connected by a rod 60 with a piston 61 operating within a cylinder 62 mounted on the table and provided with a small air outlet 63 in its side. This platform is raised by releasing the pawl 57, and by reason of its counterweighted end it acts as a regulated resistance to the plunger and thereby minimizes the possibility of bags bursting; while furthermore when tea or other substances of comparatively large grain is being packed there is less liability of same being powdered.

In order to allow the escape of air which otherwise might be imprisoned in the upper part of the cylinders and cause undue pressure within same, a vertical groove, too small to be illustrated in the drawings is formed in the side of each cylinder 6, 7, to allow the air to escape upwardly past the plunger as will be readily understood.

The apparatus is worked in the following manner:—Assuming the right hand cylinder is just receiving the weighed substance, the plunger thereof will be in its raised position and the other plunger lowered, and both will be stationary on account of the clutch being out of gear. At this time the leg of the other cylinder is closed by the hinged door and the bag of the right hand cylinder will be raised up by the table. When the cylinder is full, the treadle is operated and the plunger descends thus compressing the substance into the bag and at the same time forcing both the latter and the table down until at the limit of the movement the clutch automatically throws the plungers out of gear. Furthermore by this movement the lever of the door is operated and causes the latter to swing over thus opening the leg of the left hand cylinder. During the descent of the right hand plunger, another bag is slipped up over the left hand cylinder by means of the bag opening device and the table thereunder is raised by releasing the pawl. Thus while a bag is being packed by one plunger, the other is being placed in position for a similar operation by the other plunger and the operation is almost continuous.

When this packing apparatus is used in conjunction with a weighing machine, a warning bell is automatically rung on the latter, when the weighed substance is discharged therefrom into the cylinders so as to apprise the packing operator of the right time to throw the clutch into gear to operate the plungers.

Having now particularly described and ascertained the nature of my said invention and in what manner the same is to be performed, I declare that what I claim is:—

1. A bagging apparatus consisting of a chute having a pair of oppositely disposed discharge legs alternately opened and closed by a hinged door and leading each to one of a pair of cylinders over which the bags are drawn, a counterbalanced table to support each bag and an intermittingly reciprocable plunger working within each cylinder substantially for the purpose specified.

2. An apparatus of the class described, comprising a chute, a plurality of cylinders having communication with the chute, movable plungers in said cylinders, means for intermittently reciprocating the plungers, a hinged door for alternately opening communication between said cylinders and chute, means coöperative with the plungers to actuate the door, a table below the cylinders, and counter-balance means associated with the table for supporting a receptacle for bringing the latter in working position.

3. In an apparatus of the class described, a chute, a pair of cylinders having oppositely inclined legs to form communication between the said cylinders and chute, a door for closing the communication between one cylinder and the chute to form communication between the other cylinder and said chute, plungers movable in said cylinders, a standard having brackets forming supports for the plungers, tappets associated with the plungers for actuating the door to alternately open and close communication between the cylinders and the chute, a crank disk having its bearings in said standard, arms pivotally connected to the standard and having communication with the plungers and actuated by the crank disk to reciprocate the plungers intermittently, mechanism for actuating the crank disk, clutch means for controlling said mechanism, and a lever having connection with the clutch to operate the same.

4. In a bagging apparatus, a standard, a plurality of open end cylinders, reciprocating plungers movable in said cylinders and having rods, brackets carried by the standards forming bearings for said rods, a shaft journaled on said standard, crank disks mounted on said shaft, levers connected with the rods and said standard and actuated by the crank disks, a sprocket wheel carried by the shaft having communication with the crank disks, a driving shaft supported by the standard, a clutch slidable on said shaft and having a gear connected therewith, a chain connecting the shafts together, means for controlling said clutch to automatically throw the crank disks out of gear, a treadle, and flexible means forming connection between the treadle and clutch to actuate the latter.

5. In a bagging apparatus, a standard, a plurality of open end cylinders, reciprocating plungers movable in said cylinders and having rods, brackets carried by the standards forming bearings for said rods, a shaft journaled on said standard, crank disks mounted on said shaft, levers connected with the rods and said standard and actuated by the crank disks, a sprocket wheel carried by the shaft having connection with the crank disks, a driving shaft supported by the standard, a clutch slidable on said shaft and having a gear connected therewith, a chain connecting the shafts together, means for controlling said clutch to automatically throw the crank disks out of gear, a treadle, flexible means forming connection between the treadle and the clutch to actuate the latter, and a counter-balance bag supporting table for bringing the bags in position with respect to the cylinders.

6. In an apparatus of the class described, a standard, a prime motor shaft mounted on the latter and having a shoulder provided with a recess therein, a clutch movably mounted on the shaft, an arm forming a support on said standard, a lever having connection with the said arm and the clutch, said arm having a slot, said clutch having a tooth on each of the opposite sides thereof, one of said teeth adapted to engage the slot in the arm when moved in one direction, and the other tooth adapted to engage the recess in the shoulder of the shaft when said clutch is moved in the opposite direction, a spring connected with the lever to normally hold the clutch out of engagement of the recess in the shoulder on said shaft, a treadle having flexible connection with said lever for throwing the clutch into engagement with the shaft, a sprocket wheel associated with the clutch, a pair of cylinders, intermittently reciprocating plungers in said cylinders, crank disks journaled in said standard, levers pivotally connected to the standard and connected with the plungers and adapted to be actuated by the crank disks, a sprocket wheel associated with the crank disks, and a chain forming connection between the sprocket wheel associated with the crank disks and the sprocket wheel carried by the clutch.

7. In an apparatus of the class described, a standard, a prime motor shaft mounted on the same and having a shoulder provided with a recess therein, a clutch movably mounted on the shaft, an arm forming a support on said standard, a lever having connection with the arm and the clutch, said arm having a slot, said clutch having a tooth on each of the opposite sides thereof, one of said teeth adapted to engage the slot in the arm when moved in one direction, and the other tooth adapted to engage the recess in the shoulder of the shaft when said clutch is moved in the opposite direction, a spring connected with the lever to normally hold the clutch out of engagement of the recess in the shoulder on said shaft, a treadle having flexible connection with said lever for throwing the clutch into engagement with the shaft, a sprocket wheel associated with the clutch, a pair of cylinders, intermittently reciprocating plungers in said cylinders, crank disks journaled in said standard, levers pivotally connected to the standard and connected with the plungers and adapted to be actuated by the crank disks, a sprocket wheel associated with the crank disks, a chain forming connection between the sprocket wheel associated with the crank disks and the sprocket wheel carried by the clutch, a counter balance weight controlled supporting table, and a chute in communication with the cylinders to feed material to the latter.

8. A bagging apparatus of the class described, comprising a bag opening device having a cylinder, a vertically slidable sleeve loosely surrounding the cylinder, and downwardly and inwardly extended spring fingers carried by the sleeve.

In testimony whereof I have hereunto set my hand in presence of two subscribing witnesses.

THOMAS WHITEHORN.

Witnesses:
   EDWARD WATERS,
   EDWARD N. WATERS.